United States Patent
Wu et al.

(10) Patent No.: US 11,841,513 B2
(45) Date of Patent: Dec. 12, 2023

(54) LIGHT FIELD NEAR-EYE DISPLAY DEVICE AND METHOD OF LIGHT FIELD NEAR-EYE DISPLAY

(71) Applicant: Coretronic Corporation, Hsin-Chu (TW)

(72) Inventors: Jui-Yi Wu, Hsin-Chu (TW); Chih-Hung Lu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/724,501

(22) Filed: Apr. 20, 2022

(65) Prior Publication Data
US 2022/0373812 A1     Nov. 24, 2022

Related U.S. Application Data

(60) Provisional application No. 63/187,948, filed on May 13, 2021.

(30) Foreign Application Priority Data

Sep. 27, 2021    (CN) ............................ 202111132762.3

(51) Int. Cl.
       *G02B 27/01*       (2006.01)
(52) U.S. Cl.
       CPC ..... *G02B 27/0179* (2013.01); *G02B 27/0172* (2013.01); *G02B 2027/014* (2013.01);
       (Continued)
(58) Field of Classification Search
       CPC ............ G02B 27/0179; G02B 27/0172; G02B 2027/014; G02B 2027/0185;
       (Continued)

(56) References Cited

U.S. PATENT DOCUMENTS 6,580,555 B2    6/2003  Crista
10,890,767 B1    1/2021  Fernandez
(Continued)

FOREIGN PATENT DOCUMENTS

CN    104618710    1/2017
CN    108605120    9/2018
(Continued)

OTHER PUBLICATIONS

Fu-Chung Huang et al., "Eyeglasses-free Display: Towards Correcting Visual Aberrations with Computational Light Field Displays", ACM Transactions on Graphics, ACM, NY, US, vol. 33, No. 4, Jul. 27, 2014, pp. 1-12.
(Continued)

*Primary Examiner* — Dmitriy Bolotin
(74) *Attorney, Agent, or Firm* — JCIPRNET

(57) ABSTRACT

A light field near-eye display device and a method of light field near-eye display are provided. The light field near-eye display device includes a processor, a display panel, and a lens module. The processor adjusts a preset eye box according to a vision data to obtain an adjusted eye box, and adjusts a preset image data according to the adjusted eye box to generate an adjusted image data. The display panel is coupled to the processor and emits an image beam according to the adjusted image data. The lens module includes a micro lens array and is disposed between the display panel and a pupil. The image beam is incident on the pupil via the lens module and displays a light field image.

16 Claims, 4 Drawing Sheets

(52) U.S. Cl.
CPC ............... *G02B 2027/0185* (2013.01); *G02B 2027/0187* (2013.01)

(58) Field of Classification Search
CPC .... G02B 2027/0187; G02B 2027/0134; G02B 2027/0181; G02B 30/10; G02B 30/27
See application file for complete search history.

(56) References Cited

U.S. PATENT DOCUMENTS

| | | |
|---|---|---|
| 2014/0340390 A1 | 11/2014 | Lanman et al. |
| 2017/0205877 A1* | 7/2017 | Qin .................... G02B 27/0093 |
| 2017/0269358 A9 | 9/2017 | Luebke et al. |
| 2019/0004325 A1* | 1/2019 | Connor .............. G02B 27/0172 |
| 2019/0064526 A1* | 2/2019 | Connor ................ G02B 6/0073 |
| 2019/0243130 A1 | 8/2019 | Lamkin et al. |
| 2020/0272232 A1* | 8/2020 | Lussier .............. G02B 27/0025 |
| 2021/0011553 A1* | 1/2021 | Lussier .................. A61B 3/112 |
| 2021/0240051 A1* | 8/2021 | Jamali ................ G02B 27/0172 |
| 2022/0383782 A1* | 12/2022 | Lussier .................. G02B 30/10 |

FOREIGN PATENT DOCUMENTS

| | | |
|---|---|---|
| EP | 3203300 | 8/2017 |
| TW | 201727309 | 8/2017 |
| TW | I688254 | 3/2020 |
| TW | 202111387 | 3/2021 |

OTHER PUBLICATIONS

"Search Report of Europe Counterpart Application", dated Oct. 18, 2022, p. 1-p. 11.

"Office Action of Taiwan Counterpart Application", dated Jul. 27, 2022, p. 1-p. 6.

* cited by examiner

LIGHT FIELD NEAR-EYE DISPLAY DEVICE AND METHOD OF LIGHT FIELD NEAR-EYE DISPLAY

CROSS-REFERENCE TO RELATED APPLICATION

This application claims the priority benefit of U.S. provisional applications Ser. No. 63/187,948, filed on May 13, 2021 and China application serial no. 202111132762.3, filed on Sep. 27, 2021. The entirety of each of the above-mentioned patent applications is hereby incorporated by reference herein and made a part of this specification.

BACKGROUND OF THE INVENTION

Field of the Invention

The invention relates to a display technique, and particularly relates to a light field near-eye display device and a method of light field near-eye display.

Description of Related Art

Light field near-eye display (LFNED) is currently one of the display techniques that may resolve vergence-accommodation conflict (VAC), and may be divided into two architectures: space-division multiplexing and time-division multiplexing. Time-division multiplexing involves the use of micro-electromechanical system (MEMS) elements to change the position of the virtual image and adjust the clarity of the front and rear scenes. In space-division multiplexing, the corresponding parallax image is projected on the panel using an array lens. For example, a lens array is placed on an organic light-emitting diode (OLED) display to generate a light field image.

For light field near-eye displays, since light field near-eye displays adopt binocular parallax to form a stereoscopic image, when the user has abnormal vision, traditional light field near-eye displays usually adopt passive vision correction or active vision correction to enable the light field image to be displayed in the focus range of the user's pupil.

In the passive vision correction method, additional vision correction lenses (that is, passive lenses) are used that are disposed between the original design system and the eyes. However, passive lenses may only perform a few fixed diopter adjustments, and may only correct spherical aberration. If vision parameters such as cylinder power and axis angle need to be corrected, additional customized lenses are needed. However, customized lenses are expensive and may not be directly applied to every user.

Active vision correction methods require dynamic elements to be added to the system. Dynamic elements are, for example, liquid crystal lenses or liquid lenses, and dynamic elements may adjust the diopter and correct vision information such as spherical aberration (SPH), cylinder power (CYL), and axis angle (AXIS). However, although active adjustment may be achieved by adopting the dynamic element method, the overall device needs to integrate dynamic elements, and therefore the intrinsic characteristics of the elements need to be considered for integration. In addition, the use of dynamic elements in near-eye displays usually has issues such as insufficient diopter correction, insufficient effective aperture, degraded image quality, and increased system volume.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a light field near-eye display device and a method of light field near-eye display that allow users to view light field images with good image quality.

Other objects and advantages of the invention may be further understood from the technical features disclosed in the invention.

In order to achieve one or part or all of the above objects or other objects, a light field near-eye display device provided by an embodiment of the invention includes a processor, a display panel, and a lens module. The processor adjusts a preset eye box according to a vision data to obtain an adjusted eye box, and adjusts a preset image data according to the adjusted eye box to generate an adjusted image data. The display panel is coupled to the processor and emits an image beam according to the adjusted image data. The lens module includes a micro lens array and is disposed between the display panel and a pupil. The image beam is incident on the pupil via the lens module and displays a light field image.

In order to achieve one or part or all of the above objects or other objects, a method of light field near-eye display provided by an embodiment of the invention includes the following steps: adjusting a preset eye box according to a vision data to obtain an adjusted eye box; adjusting a preset image data according to the adjusted eye box to generate an adjusted image data; emitting an image beam according to the adjusted image data via a display panel; and making the image beam incident on a pupil via a lens module including a micro lens array and displaying a light field image.

Based on the above, the light field near-eye display device and the method of light field near-eye display of the invention may automatically adjust the image data according to the vision data, so that the display panel may emit the corresponding image beam according to the adjusted image data to provide a light field image with good image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
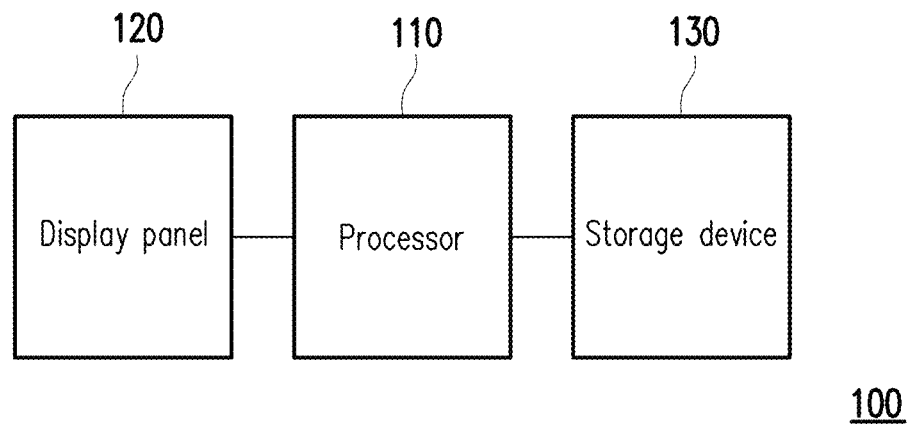
FIG. 1 is a schematic block diagram of a light field near-eye display device according to an embodiment of the invention.

FIG. 1 is a schematic block diagram of a light field near-eye display device according to an embodiment of the invention. Referring to FIG. 1, a light field near-eye display device 100 includes a processor 110, a display panel 120, and a storage device 130. The processor 110 is coupled to the display panel 120 and the storage device 130. In the embodiment, the processor 110 may generate an image data according to the original image data and system parameters, such as preset binocular pupil distance, preset eye box, preset exit pupil distance, preset ray tracing data, and other related data. The processor 110 may drive the display panel 120 according to the image data, so that the display panel 120 may emit a corresponding image beam to the user's pupil by displaying the image content to display the light field image. In the embodiment, the light field near-eye display device 100 is, for example, a head-mounted display (HMD), but the invention is not limited thereto.

In the embodiment, the processor 110 may include a central processing unit (CPU) with related control functions, driving functions, and image data computing functions, or other programmable general-purpose or special-purpose microprocessor, digital signal processor (DSP), image processing unit (IPU), graphics processing unit (GPU), programmable controller, application-specific integrated circuit (ASIC), programmable logic device (PLD), other similar control devices, or a combination of these devices. In the embodiment, the storage device 130 may be a memory, and may be configured to store related image data, system parameters, image processing modules, and related parameter calculation algorithms, etc., for the processor 110 to access and execute.

In the embodiment, the display panel 120 may be a liquid-crystal display (LCD) panel, an OLED display panel, a micro light-emitting diode display panel, or other suitable displays, and the processor 110 may drive the display panel 120 to display the corresponding image screen according to the image data. In addition, the display panel 120 emits a corresponding image beam to display the light field image due to displaying the corresponding image screen. In the embodiment, the processor 110 may adjust the preset eye box in real time according to the current vision data of the user to change the image data, so that after the image content displayed by the display panel 120 is adjusted, the light field image may be displayed in the focus range of the user's pupil.

Figure 2:
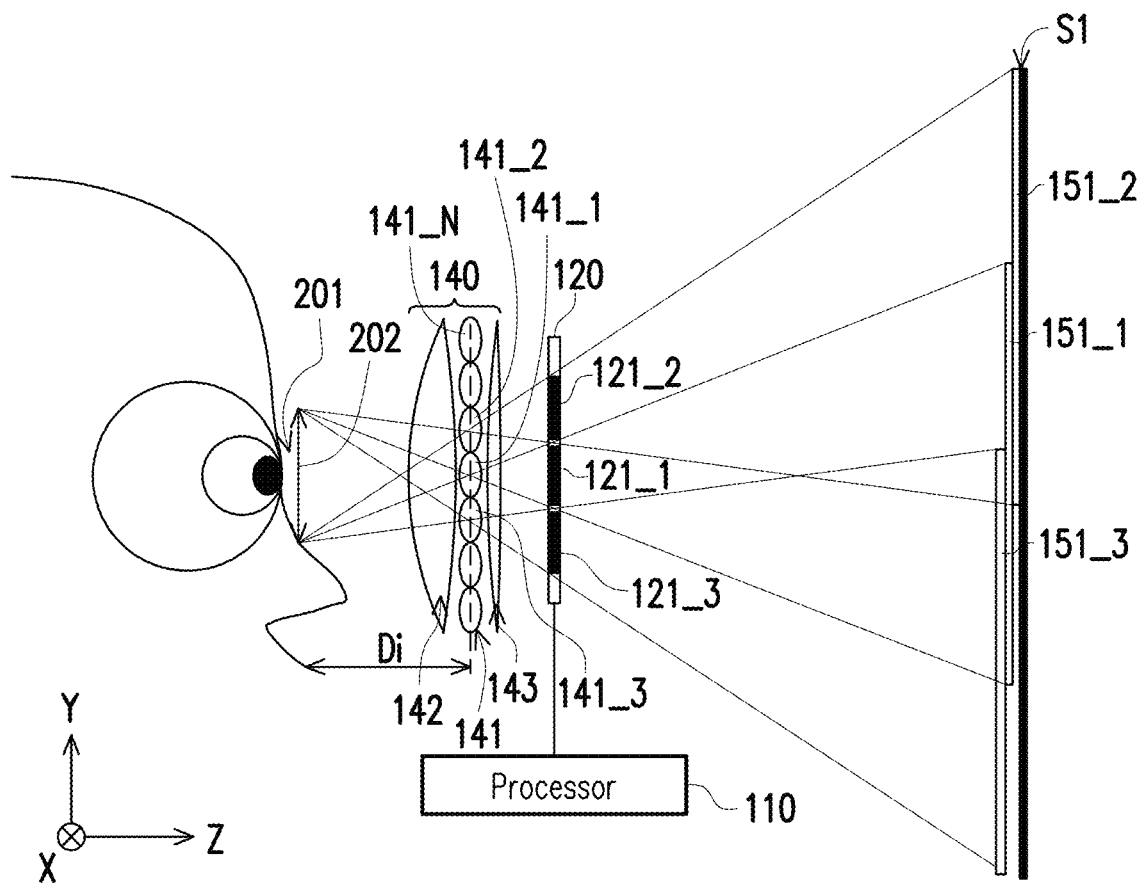
FIG. 2 is a schematic structural diagram of a light field near-eye display device according to an embodiment of the invention.

FIG. 2 is a schematic structural diagram of a light field near-eye display device according to an embodiment of the invention. Referring to FIG. 1 and FIG. 2, in the embodiment, the light field near-eye display device 100 may be disposed in front of the user's field of view. The light field near-eye display device 100 may further include a lens module 140. The user's eyes (a pupil 201) may face the display panel 120 and the lens module 140 in a direction Z. The display surface of the display panel 120 and the light incident surface and the light output surface of the lens module 140 may be, for example, parallel to a plane formed by the extension of a direction X and a direction Y, respectively. The lens module 140 may include a microlens array 141, and the microlens array 141 may include a plurality of microlenses 141_1 to 141_N arranged in an array, wherein N is a positive integer. The microlenses 141_1 to 141_N may be extended and arranged along the direction X and the direction Y, respectively. There is an exit pupil distance Di between the micro lens array 141 and a preset eye box 202. The lens module 140 may also include other lens elements. In the embodiment, the first lens 142 and the second lens 143 are taken as examples. In other embodiments, the number or form of other lens elements may be adjusted according to the image quality and effect to be presented by the light field near-eye display device 100.

In the embodiment, the lens module 140 is disposed between the display panel 120 and the pupil 201, wherein the image beam generated by the display panel 120 may be incident on the pupil 201 via the lens module 140 to display a light field image. It should be mentioned that, the result of the light field image viewed by the user from the pupil 201 (the result of imaging on the user's retina) may be as a virtual image that is equivalently formed on a remote reconstructed depth plane S1, and the equivalent optical path of the image beam thereof may be as shown in FIG. 2.

Taking a user with normal vision as an example, the pupil 201 of the user in the preset eye box 202 may receive the image beam emitted by the sub-display region of the display panel 120 corresponding to a sub-image content 121_1 via the microlens 141_1 to observe a sub-virtual image 151_1 equivalently formed on the remote reconstructed depth plane S1. Similarly, the pupil 201 of the user in the preset eye box 202 may respectively receive the image beams emitted by the sub-display regions of the display panel 120 corresponding to sub-image contents 121_2 and 121_3 via the microlenses 141_2 and 141_3 to observe sub-virtual images 151_2 and 151_3 equivalently formed on the remote reconstructed depth plane S1. In this regard, the positions and overlapping relationships of the plurality of sub-image contents displayed by the display panel 120 of the embodiment may be determined according to the ray tracing data, so that the user may view the light field image having the image of a stereoscopic object. In the embodiment, the ray tracing data may include a plurality of exit pupil position coordinates in the preset eye box 202 and a plurality of light vectors respectively from the microlenses 141_1 to 141_N of the microlens array 141 to the plurality of exit pupil position coordinates in the preset eye box 202.

It is worth noting that the eye box needs to match the user's vision conditions. It may be seen from the equivalent optical path relationship between the user's pupil 201, the microlens array 141, and the display panel 120 of the image beam shown in FIG. 2 that, when the current eye box is different from the preset eye box because the user has abnormal vision conditions, the plurality of corresponding exit pupil positions of the plurality of light vectors (light trajectories) of the plurality of image beams emitted by the display panel 120 incident on the pupil 201 via the microlenses 141_1 to 141_N in the current eye box are changed, thus affecting the image content of the light field image displayed at the pupil 201 of the user. For example, the light field image may not be displayed in the focus range of the pupil 201. Therefore, in the embodiment, the processor 110 may automatically adjust the corresponding plurality of sub-image contents displayed by the display panel 120 according to the current vision conditions. In this way, the light field image displayed by the plurality of image beams emitted to the pupil 201 of the user may be displayed in the focus range of the pupil 201.

Figure 3:
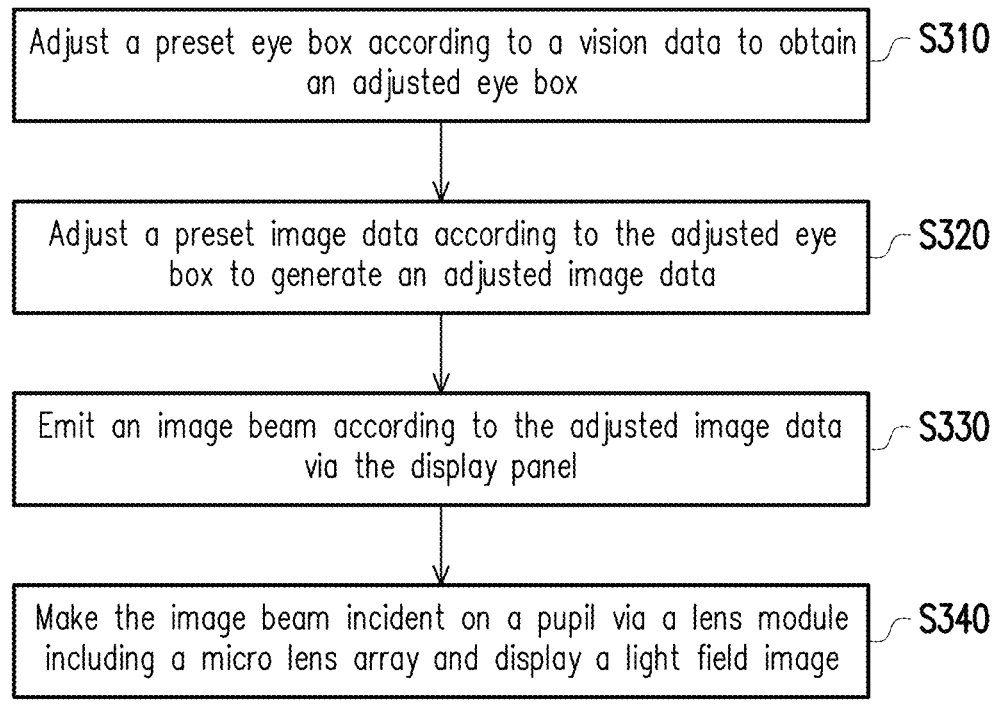
FIG. 3 is a flowchart of a method of light field near-eye display according to an embodiment of the invention.

FIG. 3 is a flowchart of a method of light field near-eye display according to an embodiment of the invention. Referring to FIG. 1 to FIG. 3, the light field near-eye display device 100 of the embodiment may perform the method of light field near-eye display including the following steps S310 to S340 to provide a good light field image display effect. It should be mentioned that, in the embodiment, the storage device 130 of the light field near-eye display device 100 may pre-store a plurality of preset exit pupil position data of the preset eye box 202 before leaving the factory. When the user wants to use the light field near-eye display device 100, the light field near-eye display device 100 may receive vision data input to the processor 110 by the user via the input device of the light field near-eye display device 100. The input device may be coupled to the processor 110, and may be, for example, a physical button disposed on the light field near-eye display device 100 or a communication interface of the light field near-eye display device 100.

In step S310, the processor 110 may adjust the preset eye box 202 according to the vision data to obtain the adjusted eye box. The processor 110 may obtain a plurality of exit pupil position data in the adjusted eye box. In step S320, the processor 110 may adjust a preset image data according to the adjusted eye box to generate an adjusted image data. In step S330, the processor 110 may emit an image beam according to the adjusted image data via the display panel 120. In step S340, the image beam may be incident on the pupil 201 via the lens module 140 including the microlens array 141 and display the light field image. Therefore, the light field near-eye display device 100 of the embodiment and the method of light field near-eye display of the embodiment executed by the light field near-eye display device 100 may automatically adjust the image data according to the current vision data to display a light field image suitable for the adjusted eye box. In addition, the method of calculating the new ray tracing data in step S310 is described in detail in the following embodiments of FIG. 4 to FIG. 7.

Figure 4:
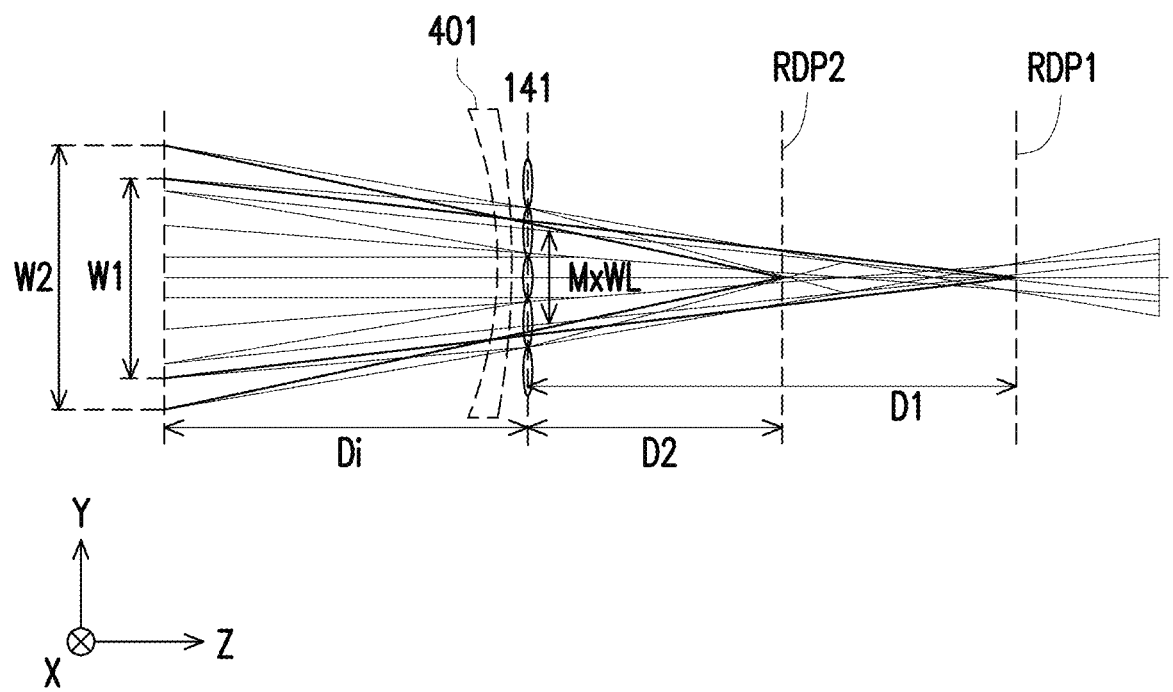
FIG. 4 is a schematic diagram of an arithmetic model of vision correction according to an embodiment of the invention.

FIG. 4 is a schematic diagram of an arithmetic model of vision correction according to an embodiment of the invention. Referring to FIG. 1, FIG. 2, and FIG. 4, the processor 110 may adjust the preset eye box 202 by using the arithmetic model of vision correction as shown in FIG. 4 to adjust the virtual image depth in the light field near-eye display device 100. In this regard, the embodiment takes myopia correction as an example. In the embodiment, the range of the preset eye box 202 in the direction Y is, for example, a preset range length W1 (the range of the preset eye box 202 in the direction X may also be, for example, the preset range length W1). The virtual image may be formed on a reconstructed depth plane (RDP) RDP1 at the other side of the microlens array 141, wherein there is a standard (preset) imaging distance D1 between the reconstructed depth plane RDP1 and the microlens array 141. However, in order to respond to the user's vision condition (myopia), the processor 110 may adjust the preset eye box 202 to equivalently place one virtual correction negative lens 401 between the user's pupil and the microlens array 141, so that the virtual image is formed on a reconstructed depth plane RDP2, wherein there is a first current imaging distance D2 (unknown parameter) between the reconstructed depth plane RDP2 and the microlens array 141. The range of the adjusted eye box in the direction Y is, for example, an adjusted range length W2 (the range of the adjusted eye box in the direction X may also be, for example, the adjusted range length W2) (unknown parameter). In addition, there is the exit pupil distance Di between the microlens array 141 and the user's pupil. In the embodiment, since the processor 110 may calculate the zoom ratio between the adjusted eye box and the preset eye box 202 according to the first current imaging distance D2, the processor 110 may first calculate the first current imaging distance D2.

Specifically, since the standard imaging distance D1 and the first current imaging distance D2 are much larger than the exit pupil distance Di, each parameter in the arithmetic model of vision correction of the embodiment may form the relationship of the following formula (1) and formula (2), wherein the microlens array 141 has M microlenses in the direction Y and the direction X, and the M microlenses respectively have an interval distance WL in between. It is worth noting that, after formula (1) and formula (2) are divided, the following formula (3) may be generated. In formula (3), a zoom ratio S is equal to the adjusted range length W2 divided by the preset range length W1. In the embodiment, the processor 110 may calculate the first current imaging distance D2 according to the following formula (4) (imaging formula). In this regard, the processor 110 may calculate the first current imaging distance D2 according to a visual acuity D and the standard imaging distance D1. Then, the processor 110 may substitute the first current imaging distance D2 into formula (3) to obtain the zoom ratio S.

$$\frac{M \times WL}{W1} = \frac{D1}{Di + D1} \qquad \text{formula (1)}$$

$$\frac{M \times WL}{W2} = \frac{D2}{Di + D2} \qquad \text{formula (2)}$$

$$S = \frac{W2}{W1} = \frac{D1(Di + D2)}{D2(Di + D1)} \qquad \text{formula (3)}$$

$$D = \frac{1}{D2} - \frac{1}{D1} \qquad \text{formula (4)}$$

Therefore, as described above, the processor 110 may calculate the zoom ratio S according to the first current imaging distance D2, the standard imaging distance D1, and the exit pupil distance Di, and may adjust the preset eye box 202 according to the zoom ratio S to obtain the adjusted eye box. As a result, the processor 110 may calculate a plurality of light vectors from the plurality of microlenses 141_1 to 141_N of the microlens array 141 respectively to the adjusted eye box according to a plurality of exit pupil position coordinates in the adjusted eye box, and the processor 110 may adjust the preset image data according to the plurality of exit pupil position coordinates and the plurality of light vectors.

Figure 5A:
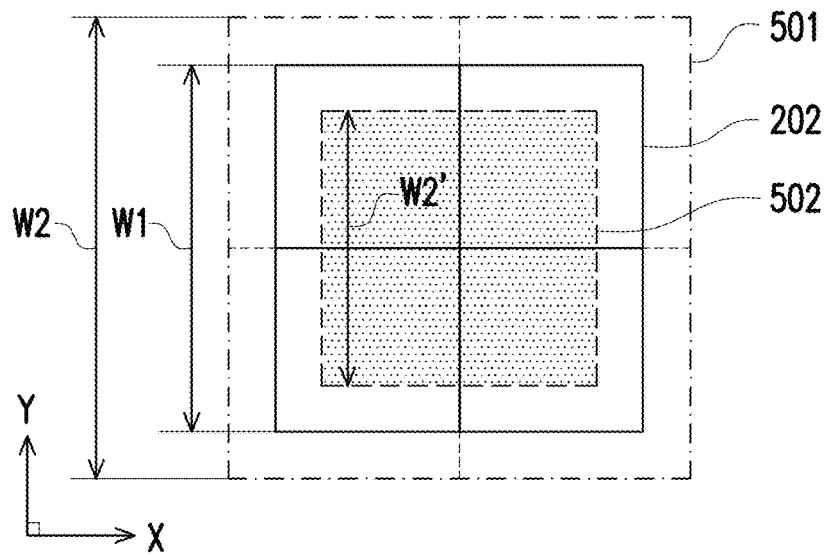
FIG. 5A is a schematic diagram of adjusting an eye box according to the first embodiment of the invention.

FIG. 5A is a schematic diagram of adjusting an eye box according to the first embodiment of the invention. Referring to FIG. 1, FIG. 2, and FIG. 5A, the preset eye box 202 may be, for example, the size of the range shown in FIG. 5A, and the exit pupil position coordinates of each point in the preset eye box 202 may be expressed as P(x, y, z). After the processor 110 performs the correlation calculation according to the visual acuity as in the embodiment of FIG. 4 to obtain the zoom ratio S, the processor 110 may adjust the preset eye box 202 to an adjusted eye box 501 or an adjusted eye box 502, wherein the exit pupil position coordinates P'(x, y, z) of each point in the adjusted eye box 501 and the adjusted eye box 502 may be expressed as the following formula (5).

$$P'(x,y,z)=P(x\times S, y\times S, z) \qquad \text{formula (5)}$$

It should be noted that the eye box 202 is the range length W1 in the direction X and the direction Y, respectively. In the case that the user has hyperopia, the range length of the adjusted eye box 501 in the direction X and the direction Y may be increased to the range length W2, respectively. Alternatively, in the case that the user has myopia, the range length of the adjusted eye box 502 in the direction X and the direction Y may be decreased to a range length W2', respectively.

Then, the processor 110 may recalculate the plurality of (normalized) light vectors $\vec{V}$ from the position coordinates (Pm(x, y, z)) of each lens center of the microlenses 141_1 to 141_N of the microlens array 141 respectively to the exit pupil position of each point in the adjusted eye box 501 or the adjusted eye box 502, wherein the light vectors $\vec{V}$ may be expressed as the following formula (6). Therefore, the processor 110 may adjust the preset image data according to the exit pupil position coordinates of each point in the adjusted eye box 501 or the adjusted eye box 502 and the plurality of corresponding light vectors. In this way, the display panel 120 may emit an image beam according to the adjusted image data to display the light field image in the focus range of the pupil 201.

$$\vec{V}=\text{Norm}((Pm(x,y,z)-P'(x,y,z)) \qquad \text{formula (6)}$$

Figure 5B:
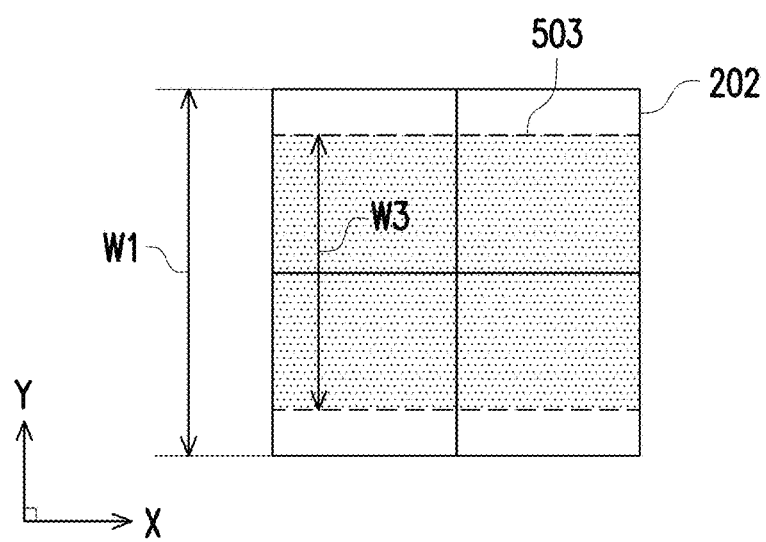
FIG. 5B is a schematic diagram of adjusting an eye box according to the second embodiment of the invention.

FIG. 5B is a schematic diagram of adjusting an eye box according to the second embodiment of the invention. Referring to FIG. 1, FIG. 2, and FIG. 5B, taking regular astigmatism with an axis angle of 0 degrees as an example, the vision data input to the processor 110 may include a cylinder power and an axis power. The processor 110 may calculate a current imaging distance according to the cylinder power and a standard imaging distance. Similar to the architecture of FIG. 4 above, in the embodiment, since the standard imaging distance D1 and a second current imaging distance D2' are much larger than the exit pupil distance Di, each parameter in the arithmetic model may form the relationship of the following formula (7) and formula (8), wherein the microlens array 141 has M microlenses in the direction Y, and the M microlenses respectively have the interval distance WL in between. It is worth noting that after formula (7) and formula (8) are divided, the result of a zoom ratio S' of the following formula (9) may be produced. In formula (9), the zoom ratio S' is equal to an adjusted range length W3 divided by the preset range length W1 of the preset eye box 202 in the direction Y. In the embodiment, the processor 110 may calculate the second current imaging distance D2' according to the following formula (10) (imaging formula).

In this regard, the processor 110 may calculate the second current imaging distance D2' according to a cylinder power D' and the standard imaging distance D1. Then, the processor 110 may substitute the second current imaging distance D2' into formula (9) to obtain the zoom ratio S'.

$$\frac{M \times WL}{W1} = \frac{D1}{Di+D1} \qquad \text{formula (7)}$$

$$\frac{M \times WL}{W3} = \frac{D2'}{Di+D2'} \qquad \text{formula (8)}$$

$$S' = \frac{W3}{W1} = \frac{D1(Di+D2')}{D2(Di+D2')} \qquad \text{formula (9)}$$

$$D' = \frac{1}{D2'} - \frac{1}{D1} \qquad \text{formula (10)}$$

As shown in FIG. 5B, the exit pupil position coordinates of each point in the preset eye box 202 may be expressed as P(x, y, z). The processor 110 may execute the following formula (11) to rotate the exit pupil position coordinates P(x, y, z) of each point of the preset eye box 202 by an angle (θ) and then adjust the zoom ratio S' to obtain the exit pupil position coordinates Pt(x, y, z). Next, the processor 110 may execute the following formula (12) to rotate the exit pupil position coordinates Pt(x, y, z) of each point after the zoom adjustment by an angle (−θ) to obtain the exit pupil position coordinates P"(x, y, z) of each point in an adjusted eye box 503.

$$Pt(x,y,z)=P(x \cos θ−y \sin θ,(x \sin θ+y \cos θ)\times S',z) \qquad \text{formula (11)}$$

$$P''(x,y,z)=Pt(x \cos(-θ)−y \sin(-θ),(x \sin(-θ)+y \cos(-θ)),z) \qquad \text{formula (12)}.$$

Then, the processor 110 may recalculate the plurality of (normalized) light vectors $\vec{V}'$ from the position coordinates (Pm(x, y, z)) of each lens center of the microlenses 141_1 to 141_N of the microlens array 141 respectively to the exit pupil position of each point in the adjusted eye box 503 as the following formula (13). Therefore, the processor 110 may adjust the preset image data according to the exit pupil position coordinates P"(x, y, z) of each point in the adjusted eye box 503 and the plurality of corresponding light vectors. In this way, the display panel 120 may emit an image beam according to the adjusted image data to display the light field image in the focus range of the pupil 201.

$$\vec{V}'=\text{Norm}((Pm(x,y,z)-P''(x,y,z)) \qquad \text{formula (13)}$$

Figure 5C:
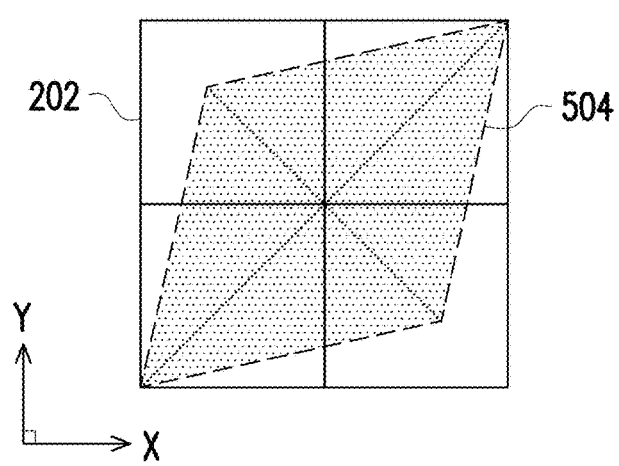
FIG. 5C is a schematic diagram of adjusting an eye box according to the third embodiment of the invention.

Referring to FIG. 1, FIG. 2, and FIG. 5C, similar to FIG. 5B, the embodiment takes regular astigmatism with an axis angle of 45 degrees as an example. The processor 110 may calculate the zoom ratio S' according to the above formula (7) to formula (10), and may perform calculations similar to the above formula (11) and formula (12) to obtain the exit pupil position coordinates of each point in an adjusted eye box 504. Then, the processor 110 may recalculate the plurality of (normalized) light vectors from the position coordinates (Pm(x, y, z)) of each lens center of the microlenses 141_1 to 141_N of the microlens array 141 respectively to the exit pupil position of each point in the adjusted eye box 504. Therefore, the processor 110 may adjust the preset image data according to the exit pupil position coordinates of each point in the adjusted eye box 504 and the plurality of corresponding light vectors. In this way, the display panel 120 may emit an image beam according to the adjusted image data to display the light field image in the focus range of the pupil 201.

Figure 6:
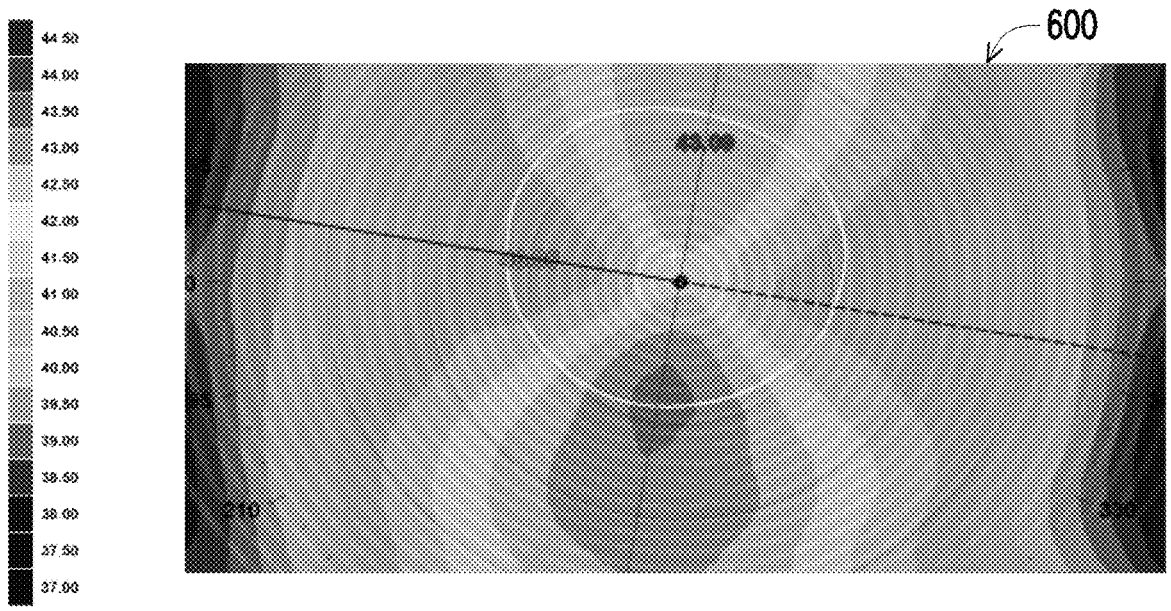
FIG. 6 is a schematic diagram of the diopter distribution of irregular astigmatism according to an embodiment of the invention.
Figure 7:
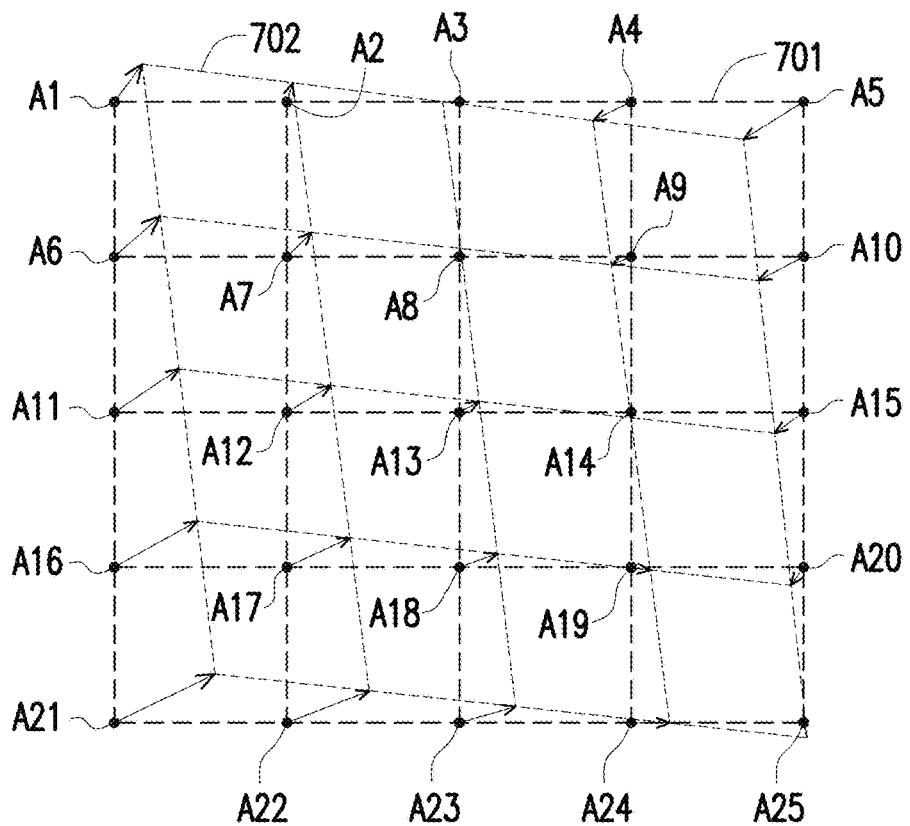
FIG. 7 is a schematic diagram of adjusting an eye box according to the fourth embodiment of the invention.

FIG. 6 is a schematic diagram of the diopter distribution of irregular astigmatism according to an embodiment of the invention. FIG. 7 is a schematic diagram of adjusting an eye box according to the fourth embodiment of the invention. Referring to FIG. 1, FIG. 2, FIG. 6, and FIG. 7, in the embodiment, the storage device 130 of the light field near-eye display device 100 may be pre-stored with an optical simulation module. Taking irregular astigmatism as an example, the diopter distribution of irregular astigmatism on the human cornea may be a refractive power distribution 600 as shown in FIG. 6, wherein different grayscale regions represent changes in diopter. In this regard, the processor 110 may obtain a plurality of corresponding cylinder powers and a plurality of axis angles according to the change of the diopter on the diopter distribution 600. In the embodiment, the processor 110 may input a plurality of cylinder powers and a plurality of axis angles corresponding to the human cornea to the optical simulation module.

In the embodiment, a preset eye box 701 may, for example, have a plurality of grid ranges formed by a plurality of grid points A1 to A25. The processor 110 may input a plurality of cylinder powers and a plurality of axis angles to the optical simulation module, so that the optical simulation module may adjust a plurality of grid ranges of the preset eye box 701 according to a plurality of cylinder powers and a plurality of axis angles. Specifically, each grid in the preset eye box 701 corresponds to a specific cylinder power and a specific axis angle. The processor 110 may perform calculations as shown in FIG. 5B or FIG. 5C for each grid in the preset eye box 701 to individually adjust the range of each grid. For example, the processor 110 may respectively calculate a plurality of exit pupil position coordinates and a plurality of light vectors corresponding to the adjusted range for the positions of the four corners of each grid in the preset eye box 701. Therefore, the positions of the grid points A1 to A25 of the preset eye box 701 may be adjusted correspondingly according to the plurality of cylinder powers and the plurality of axis angles to change the plurality of grid ranges to form an adjusted eye box 702 as shown in FIG. 7. It should be noted that the distance between the plurality of grid points in the adjusted eye box 702 is not limited to equal width length.

Therefore, in the embodiment, the processor may calculate a plurality of light vectors from the plurality of microlenses 141_1 to 141_N of the microlens array 141 respectively to the adjusted grid ranges of the adjusted eye box 702, respectively according to the plurality of exit pupil position coordinates in the plurality of adjusted grid ranges of the adjusted eye box 702. Moreover, the processor 110 may adjust the preset image data according to the exit pupil position coordinates and the light vectors, so that the display panel 120 may emit an image beam according to the adjusted image data to display the light field image in the focus range of the pupil 201.

Based on the above, the light field near-eye display device and the method of light field near-eye display of the invention may automatically adjust the image data according to the user's current vision data, so that the display panel may emit the corresponding image beam according to the adjusted image data. As a result, the image beam may be correctly incident on the user's pupil, and the light field image may be displayed in the focus range of the pupil, so that the user may view the light field image with good image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:
1. A light field near-eye display device, comprising:
   a processor adjusting a preset eye box according to a vision data to obtain an adjusted eye box, and adjusting a preset image data according to the adjusted eye box to generate an adjusted image data;
   a display panel coupled to the processor and emitting an image beam according to the adjusted image data; and
   a lens module comprising a micro lens array and disposed between the display panel and a pupil, wherein the image beam is incident on the pupil via the lens module and displays a light field image,
   wherein the vision data comprises a visual acuity, and the processor calculates a first current imaging distance according to the visual acuity and a standard imaging distance,
   wherein the processor calculates a zoom ratio between the adjusted eye box and the preset eye box according to the first current imaging distance to adjust the preset eye box according to the zoom ratio to obtain the adjusted eye box,
   wherein the processor calculates a plurality of light vectors from a plurality of microlenses of the microlens array respectively to the adjusted eye box according to a plurality of exit pupil position coordinates in the adjusted eye box, and the processor adjusts the preset image data according to the exit pupil position coordinates and the light vectors.

2. The light field near-eye display device of claim 1, wherein the processor calculates the zoom ratio according to the first current imaging distance, the standard imaging distance, and an exit pupil distance.

3. The light field near-eye display device of claim 1, wherein the zoom ratio is a result of dividing a preset range length of the preset eye box by an adjusted range length of the adjusted eye box, and the processor determines the adjusted eye box according to the adjusted range length.

4. The light field near-eye display device of claim 1, wherein the light field image is displayed in a focus range of the pupil.

5. A light field near-eye display device, comprising:
a processor adjusting a preset eye box according to a vision data to obtain an adjusted eye box, and adjusting a preset image data according to the adjusted eye box to generate an adjusted image data;
a display panel coupled to the processor and emitting an image beam according to the adjusted image data; and
a lens module comprising a micro lens array and disposed between the display panel and a pupil, wherein the image beam is incident on the pupil via the lens module and displays a light field image,
wherein the vision data comprises a cylinder power and an axis angle, and the processor calculates a second current imaging distance according to the cylinder power and a standard imaging distance, and the processor calculates a rotation angle according to the axis angle,
wherein the processor calculates a second zoom ratio on at least one axial degree between the adjusted eye box and the preset eye box according to the second current imaging distance to determine the adjusted eye box according to the second zoom ratio and the rotation angle.

6. The light field near-eye display device of claim 5, wherein the processor calculates a plurality of light vectors from a plurality of microlenses of the microlens array respectively to the adjusted eye box according to a plurality of exit pupil position coordinates in the adjusted eye box, and the processor adjusts the preset image data according to the exit pupil position coordinates and the light vectors.

7. A light field near-eye display device, comprising:
a processor adjusting a preset eye box according to a vision data to obtain an adjusted eye box, and adjusting a preset image data according to the adjusted eye box to generate an adjusted image data;
a display panel coupled to the processor and emitting an image beam according to the adjusted image data; and
a lens module comprising a micro lens array and disposed between the display panel and a pupil, wherein the image beam is incident on the pupil via the lens module and displays a light field image,
wherein the vision data comprises a plurality of cylinder powers and a plurality of axis angles, and the processor inputs the cylinder powers and the axis angles to an optical simulation module to generate a plurality of adjusted grid ranges of the adjusted eye box.

8. The light field near-eye display device of claim 7, wherein the processor calculates a plurality of light vectors from a plurality of microlenses of the microlens array respectively to the adjusted grid ranges of the adjusted eye box according to a plurality of exit pupil position coordinates in the adjusted grid ranges of the adjusted eye box respectively, and the processor adjusts the preset image data according to the exit pupil position coordinates and the light vectors.

9. A method of light field near-eye display, comprising:
adjusting a preset eye box according to a vision data to obtain an adjusted eye box, wherein the vision data comprises a visual acuity, and the step of obtaining the adjusted eye box comprises:
calculating a first current imaging distance according to the visual acuity and a standard imaging distance;
calculating a zoom ratio between the adjusted eye box and the preset eye box according to the first current imaging distance; and
adjusting the preset eye box according to the zoom ratio to obtain the adjusted eye box;
adjusting a preset image data according to the adjusted eye box to generate an adjusted image data, wherein the step of generating the adjusted image data comprises:
calculating a plurality of light vectors from a plurality of microlenses of the microlens array respectively to the adjusted eye box according to a plurality of exit pupil position coordinates in the adjusted eye box; and
adjusting the preset image data according to the exit pupil position coordinates and the light vectors;
emitting an image beam according to the adjusted image data via a display panel; and
making the image beam incident on a pupil via a lens module comprising a micro lens array and displaying a light field image.

10. The method of light field near-eye display of claim 9, wherein the step of calculating the zoom ratio comprises:
calculating the zoom ratio according to the first current imaging distance, the standard imaging distance, and an exit pupil distance.

11. The method of light field near-eye display of claim 9, wherein the step of obtaining the adjusted eye box comprises:
determining the adjusted eye box according to an adjusted range length,
wherein the zoom ratio is a result of dividing a preset range length of the preset eye box by the adjusted range length of the adjusted eye box.

12. The method of light field near-eye display of claim 9, wherein the light field image is displayed in a focus range of the pupil.

13. A method of light field near-eye display, comprising:
adjusting a preset eye box according to a vision data to obtain an adjusted eye box;
adjusting a preset image data according to the adjusted eye box to generate an adjusted image data;
emitting an image beam according to the adjusted image data via a display panel; and
making the image beam incident on a pupil via a lens module comprising a micro lens array and displaying a light field image,
wherein the vision data comprises a cylinder power and an axis angle, and the step of obtaining the adjusted eye box comprises:
calculating a second current imaging distance according to the cylinder power and a standard imaging distance;
calculating a rotation angle according to the axis angle;
calculating a second zoom ratio on at least one axial degree between the adjusted eye box and the preset eye box according to the second current imaging distance; and determining the adjusted eye box according to the second zoom ratio and the rotation angle.

14. The method of light field near-eye display of claim 13, wherein the step of generating the adjusted image data comprises:
   calculating a plurality of light vectors from a plurality of microlenses of the microlens array respectively to the adjusted eye box according to a plurality of exit pupil position coordinates in the adjusted eye box; and
   adjusting the preset image data according to the exit pupil position coordinates and the light vectors.

15. A method of light field near-eye display, comprising:
   adjusting a preset eye box according to a vision data to obtain an adjusted eye box;
   adjusting a preset image data according to the adjusted eye box to generate an adjusted image data;
   emitting an image beam according to the adjusted image data via a display panel; and
   making the image beam incident on a pupil via a lens module comprising a micro lens array and displaying a light field image,
   wherein the vision data comprises a plurality of cylinder powers and a plurality of axis angles, and the step of obtaining the adjusted eye box comprises:
   entering the cylinder powers and the axis angles to an optical simulation module to generate a plurality of adjusted grid ranges of the adjusted eye box.

16. The method of light field near-eye display of claim 15, wherein the step of generating the adjusted image data comprises:
   calculating a plurality of light vectors from a plurality of microlenses of the microlens array respectively to the adjusted grid ranges of the adjusted eye box respectively according to a plurality of exit pupil position coordinates in the adjusted grid ranges of the adjusted eye box; and
   adjusting the preset image data according to the exit pupil position coordinates and the light vectors.

* * * * *